(12) United States Patent
Kitamura et al.

(10) Patent No.: US 11,508,337 B2
(45) Date of Patent: Nov. 22, 2022

(54) IMAGE PROCESSING APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventors: Kaihei Kitamura, Tokyo (JP); Satoru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/443,276

(22) Filed: Jul. 23, 2021

(65) Prior Publication Data

US 2022/0036858 A1 Feb. 3, 2022

(30) Foreign Application Priority Data

Jul. 30, 2020 (JP) .............................. JP2020-129528
Jun. 23, 2021 (JP) .............................. JP2021-103967

(51) Int. Cl.
*G06T 5/00* (2006.01)
*G09G 5/10* (2006.01)
*G06F 3/04847* (2022.01)

(52) U.S. Cl.
CPC ............... *G09G 5/10* (2013.01); *G06T 5/009* (2013.01); *G06F 3/04847* (2013.01);
(Continued)

(58) Field of Classification Search
CPC ............. G09G 5/10; G09G 2320/0606; G09G 2320/0626; G09G 2320/066;
(Continued)

(56) References Cited

U.S. PATENT DOCUMENTS

| 2009/0079721 | A1 | 3/2009 | Gettemy |
| 2009/0231469 | A1* | 9/2009 | Kato ...................... H04N 5/235 348/E5.041 |

(Continued)

FOREIGN PATENT DOCUMENTS

| EP | 1858002 A | 11/2007 |
| EP | 3136375 A1 | 3/2017 |

(Continued)

OTHER PUBLICATIONS

The above foreign documents were cited in a European Partial Search Report dated Nov. 9, 2021, which is enclosed, that issued in the corresponding European Patent Application No. 21188150.3.

(Continued)

*Primary Examiner* — Antonio A Caschera
(74) *Attorney, Agent, or Firm* — Cowan, Liebowitz & Latman, P.C.

(57) ABSTRACT

An image processing apparatus according to the present invention, includes: an input unit configured to receive a predetermined user operation for an image displayed on a display; a change unit configured to perform control of increasing a display range of the display in a case where the predetermined user operation is received by the input unit; a processing unit configured to perform gradation conversion on the image to improve gradation of a high brightness portion, based on the display range increased by the change unit; and a control unit configured to perform control of enabling the increase in the display range in accordance with the predetermined user operation in a case where the image satisfies a predetermined condition and disabling the increase in the display range in accordance with the predetermined user operation in a case where the image does not satisfy the predetermined condition.

16 Claims, 8 Drawing Sheets

(52) U.S. Cl.
CPC ...... *G06T 2200/24* (2013.01); *G06T 2207/20208* (2013.01); *G09G 2320/0606* (2013.01); *G09G 2320/066* (2013.01); *G09G 2320/0626* (2013.01); *G09G 2320/08* (2013.01); *G09G 2354/00* (2013.01); *G09G 2360/144* (2013.01)

(58) Field of Classification Search
CPC ........... G09G 2320/08; G09G 2354/00; G09G 2360/144; G06T 5/009; G06T 2200/24; G06T 2207/20208; G06F 3/04847
See application file for complete search history.

(56) References Cited

U.S. PATENT DOCUMENTS

| | | | |
|---|---|---|---|
| 2010/0188325 A1* | 7/2010 | Inoue | H04N 21/42202 |
| | | | 345/207 |
| 2016/0034112 A1 | 2/2016 | Yoon | |
| 2018/0262672 A1* | 9/2018 | Woo | H04N 19/46 |
| 2019/0035063 A1 | 1/2019 | Park et al. | |

FOREIGN PATENT DOCUMENTS

| | | |
|---|---|---|
| JP | 2017-050840 A | 3/2017 |
| KR | 20180103239 | 9/2018 |

OTHER PUBLICATIONS

The above patent documents were cited in a European Search Report dated Apr. 12, 2022, which is enclosed, that issued in the corresponding European Patent Application No. 21188150.3.

* cited by examiner

IMAGE PROCESSING APPARATUS, IMAGE PROCESSING METHOD, AND NON-TRANSITORY COMPUTER READABLE MEDIUM

BACKGROUND OF THE INVENTION

Field of the Invention

The present invention relates to an image processing apparatus and an image processing method. In particular, the present invention relates to a technique for changing a dynamic range (brightness range) of a display.

Description of the Related Art

In recent years, as an input device such as a smartphone and a digital camera, models capable of recording an image having a wide dynamic range (brightness range), which is called an HDR (high dynamic range) image, for example, have been commercialized. The HDR image includes, for example, an image having a gradation value (signal value) that corresponds to absolute brightness. The gradation value corresponding to the absolute brightness is, for example, a gradation value conforming to the EOTF (electro-optical transfer function) prescribed by the ITU-R (Radiocommunication Sector of the ITU) BT. 2100, a gradation value conforming to the EOTF prescribed by the SMPTE (Society of Motion Picture and Television Engineers) ST. 2084, or the like. These EOTFs are called PQ (perceptual quantization) curves, for example. The EOTFs such as PQ curves correspond to functions for converting a gradation value (brightness gradation value; pixel value) into brightness.

In addition, HDR displays capable of displaying an HDR image with a wide dynamic range (display range) are becoming available, and smartphones, etc., equipped with an HDR display have been commercialized.

However, smartphones or the like are often used with reduced display brightness (brightness of an image on a display) to extend the operation time by reducing power consumption. When the brightness of the display is set low, the upper limit of the brightness of the display is lowered, and consequently, the maximum brightness of the display is lowered.

As a result, for example, when an HDR image recorded in accordance with the PQ curve described above is displayed on an HDR display, a situation where the upper limit of the brightness of the HDR display is lower than the brightness of the HDR image (the brightness corresponding to a pixel value of the HDR image in the PQ curve) may arise. In such a situation, blown-out highlights may occur in a region (for example, a highlighted region), where the brightness of the HDR image is higher than the upper limit of the brightness of the HDR display, in the HDR image. It is considered that a user may increase the upper limit of the brightness of the HDR display to a desired level, that is, a user changes (expands) the display range to a desired brightness range, so as to reduce the blown-out highlights. However, such operation is difficult, and the display range may be expanded more than necessary.

Japanese Patent Application Publication No. 2017-50840 discloses a technique for converting (compressing) the dynamic range of an HDR image so that the HDR image can be displayed on a display device of which display brightness is set low. Specifically, in the technique disclosed in Japanese Patent Application Publication No. 2017-50840, the entire dynamic range from the dark area to the bright area is compressed. This technique can reduce the blown-out highlights but changes the display of the dark area. Specifically, the gradation (gradation resolution; brightness gradation; brightness gradation resolution) of the dark area may be degraded, or the displayed image may be dark overall.

SUMMARY OF THE INVENTION

An image processing apparatus according to the present invention, includes at least one memory and at least one processor which function as: an input unit configured to receive a predetermined user operation for an image displayed on a display; a change unit configured to perform control of increasing a display range of the display in a case where the predetermined user operation is received by the input unit; a processing unit configured to perform gradation conversion on the image to improve gradation of a high brightness portion, based on the display range increased by the change unit; and a control unit configured to perform control of enabling the increase in the display range in accordance with the predetermined user operation in a case where the image satisfies a predetermined condition and disabling the increase in the display range in accordance with the predetermined user operation in a case where the image does not satisfy the predetermined condition.

Further features of the present invention will become apparent from the following description of exemplary embodiments with reference to the attached drawings.

DESCRIPTION OF THE EMBODIMENTS

Embodiment 1

Hereinafter, Embodiment 1 of the present invention will be described. An image processing apparatus according to Embodiment 1 performs gradation conversion on an image and displays a gradation-converted image on a display unit.

When a user operation for specifying a dynamic range (brightness range) is performed, the image processing apparatus displays an item for the user operation together with the gradation-converted image. In response to the execution of the range-specifying operation, the image processing apparatus changes the setting of a display range and changes conversion characteristic of gradation conversion. Specifically, the image processing apparatus changes the setting of a display range, which is a dynamic range of a display on the display unit, based on a specified range, which is a dynamic range specified by the user operation. Next, the image processing apparatus changes the conversion characteristic of the gradation conversion in accordance with the changed display range.

Figure 1:
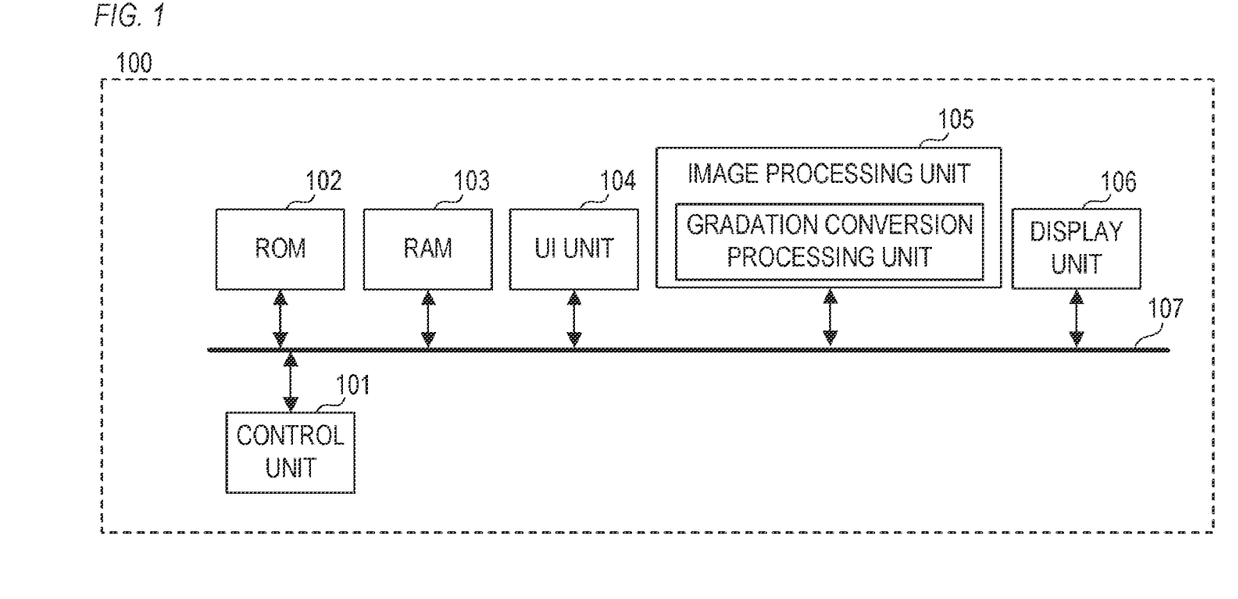
FIG. 1 is a block diagram illustrating a configuration example of an image processing apparatus according to Embodiment 1.

FIG. 1 is a block diagram illustrating a configuration example of an image processing apparatus 100 according to Embodiment 1. The image processing apparatus 100 includes a control unit 101, a ROM (read-only memory) 102, a RAM (random access memory) 103, an UI (user interface) unit 104, an image processing unit 105, and a display unit 106, which are connected to each other by a bus 107.

The control unit 101 controls an operation of each unit of the image processing apparatus 100. For example, the control unit 101 is a CPU (central processing unit) and controls an operation of each unit of the image processing apparatus 100 by executing a program read from the ROM 102 and expanded in the RAM 103.

The ROM 102 is a non-volatile memory capable of electrically erasing and recording various kinds of data and stores a program executed by the control unit 101, parameters needed for an operation of each unit of the image processing apparatus 100, an image (image data) to be processed, etc. The image to be processed may be obtained from an external device.

The RAM 103 is a volatile memory capable of electrically erasing and recording various kinds of data. The program stored in the ROM 102 is expanded in the RAM 103 and the parameters, the images, etc., stored in the ROM 102 are temporarily stored in the RAM 103 by the control unit 101. The parameters, the images, etc., generated in each unit are also stored in the RAM 103 by the control unit 101.

The UI 104 receives a user operation for the image processing apparatus 100. For example, the UI unit 104 is a pointing device such as a touch panel and a mouse, a keyboard, or the like. The UI unit 104 (operation device) may be an external device or a part thereof, and the image processing apparatus 100 may have an interface for connecting to such an external device so as to obtain information in accordance with a user operation.

The image processing unit 105 performs various kinds of image processing, such as white balance adjustment, color interpolation, gamma processing, etc., on the image (processing-target image) stored in the RAM 103. The image processing unit 105 includes a gradation conversion processing unit 200 that performs gradation conversion on an image.

The display unit 106 displays the image (the image after the gradation conversion) stored in the RAM 103. In addition, the display unit 106 displays an item (UI) for the user operation. For example, the display unit 106 is a display device such as a liquid crystal panel or an organic EL (electro luminescence) panel. The display unit 106 may be an external device, such as a smartphone or a television device, or a part thereof, and the image processing apparatus 100 may have an interface for connecting to such an external device so as to control the display unit 106.

Figure 2:
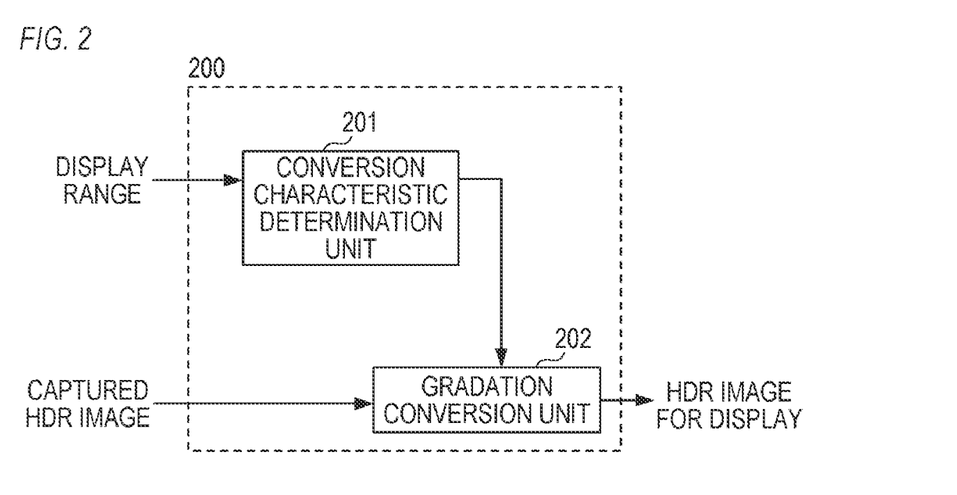
FIG. 2 is a block diagram illustrating a configuration example of a gradation conversion processing unit according to Embodiment 1.

FIG. 2 is a block diagram illustrating a configuration example of the gradation conversion processing unit 200. The gradation conversion processing unit 200 includes a conversion characteristic determination unit 201 and a gradation conversion unit 202. The conversion characteristic determination unit 201 determines conversion characteristic of gradation conversion. The gradation conversion unit 202 performs gradation conversion on an image by using the conversion characteristic determined by the conversion characteristic determination unit 201.

Figure 3:
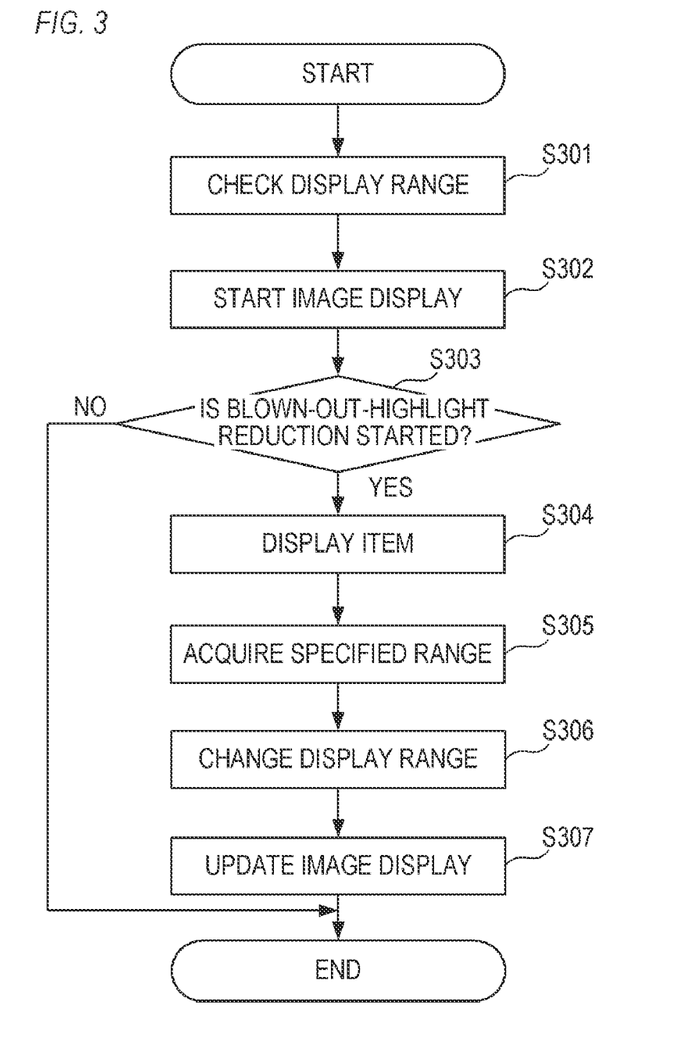
FIG. 3 is a flowchart illustrating an example of a display control operation according to Embodiment 1.

FIG. 3 is a flowchart illustrating an example of a display control operation performed by the image processing apparatus 100. For example, in response to the activation of the image processing apparatus 100, the display control operation in FIG. 3 is started by the control unit 101 executing a program read from the ROM 102 and expanded in the RAM 103.

In S301, the control unit 101 checks the setting of a display range, which is a dynamic range of a display on the display unit 106. In Embodiment 1, the minimum brightness of the display range is fixed to 0 nit, and only the maximum brightness of the display range is changeable. Thus, the setting of the display range may also be referred to as the setting of maximum brightness of the display range. For example, when the maximum brightness of the display range is set to 500 nit, the display range of 0 to 500 nit is set, and when the maximum brightness of the display range is set to 800 nit, the display range of 0 to 800 nit is set. Alternatively, the maximum brightness of the display range may be fixed and only the minimum brightness may be changeable, or both the maximum and minimum brightnesses of the display range may be changeable.

In S302, the control unit 101 performs a control operation for displaying a processing target image on the display unit 106 in accordance with the current display range (the display range checked in S301) in response to the user operation using the UI unit 104. This user operation is, for example, a user operation for selecting and displaying a processing target image. While the processing target image is not particularly limited, the processing target image is assumed to be an HDR image that has been captured (a captured HDR image) in this embodiment. The HDR (high dynamic range) image is an image having a greater number of bits and a wider dynamic range than an SDR (standard dynamic range) image, which is, for example, an image in accordance with the ITU-R BT. 709.

Figure 4:
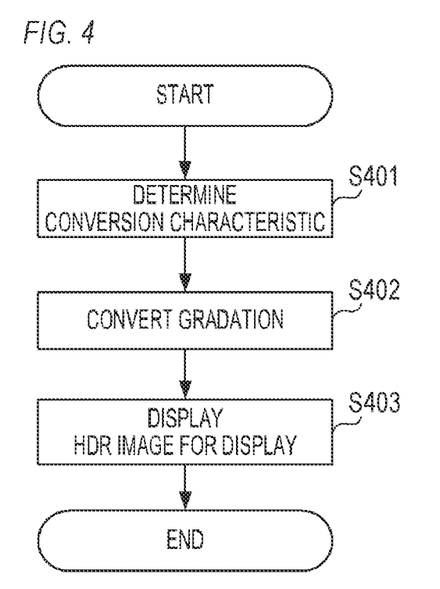
FIG. 4 is a flowchart illustrating an example of an image display processing according to Embodiment 1.

A specific example of the processing in S302 will be described with reference to a flowchart in FIG. 4. FIG. 4 is a flowchart illustrating an example of the processing (image display processing) in S302 and S307, which will be described below.

In S401, the conversion characteristic determination unit 201 determines conversion characteristic of gradation conversion of the captured HDR image in accordance with the display range (the maximum brightness of the display range) checked in S301. While the captured HDR image is not particularly limited, the captured HDR image is assumed to be an image in accordance with the PQ (perceptual quantization) curve in this embodiment. The PQ curve is the EOTF (electro-optical transfer function) specified in the ITU-R (Radiocommunication Sector of ITU) BT. 2100 or the EOTF specified in the SMPTE (Society of Motion Picture and Television Engineers) ST. 2084.

Figures 5A, 5B:
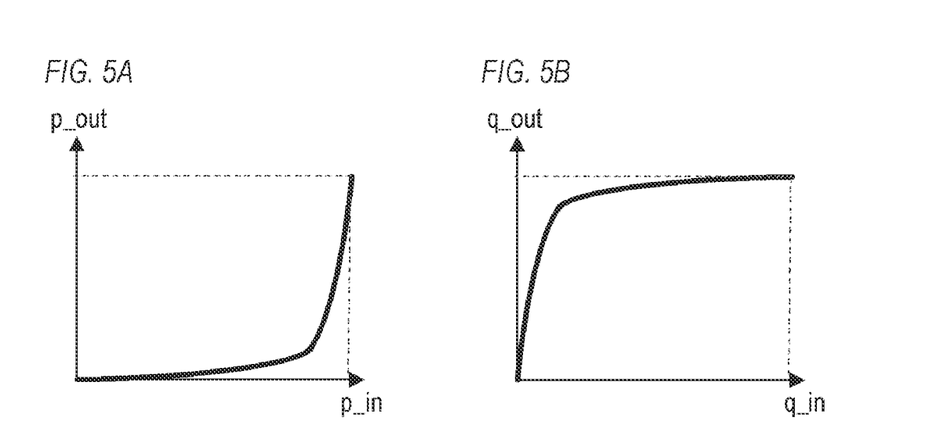
FIG. 5A is a diagram illustrating an example of an EOTF according to Embodiment 1.
FIG. 5B is a diagram illustrating an example of an OETF according to Embodiment 1.

FIG. 5A illustrates an example of the PQ curve (EOTF). The EOTF corresponds to a function for converting a gradation value (a brightness gradation value; a pixel value) into brightness. Specifically, the EOTF in FIG. 5A is expressed by Formula 1 below. In Formula 1, p_in represents an input value of the EOTF and is a value obtained by normalizing the gradation value (R value, G value, B value, etc.) to a range of 0.0 to 1.0. In addition, p-in =1.0 corresponds to the upper limit of the gradation value (the upper limit corresponding to the number of bits), and p_in =0.0 corresponds to the lower limit of the gradation value. For example, when the number of bits of the gradation value is 10 bits, the upper limit of the gradation value is 1023, and the lower limit of the gradation value is 0. Further, p_out represents an output value of the EOTF and is a gradation value obtained by normalizing the gradation value (R value, G value, B value, etc.) proportional to the brightness to a range of 0.0 to 1.0. For example, p_out=0.0 corresponds to 0 nit, and p_out=1.0 corresponds to 10000 nit. In addition, max [x, y] is a function for outputting the greater value of x and y. In Embodiment 1, the display unit 106 displays the image with brightness corresponding to the output value p_out.

[Math. 1]

$$p\_out = \left(\frac{\max[(p\_in^{1/m_2} - c_1), 0]}{c_2 - c_3 \cdot p\_in^{1/m_2}}\right)^{1/m_1} \quad \text{Formula 1}$$

$m_1 = 0.1593017578125, m_2 = 78.84375,$
$c_1 = 0.8359375, c_2 = 18.8515625, c_3 = 18.6875$

FIG. 5B illustrates an example of the OETF (opto-electronic transfer function) having inverse characteristic of the EOTF in FIG. 5A. The OETF corresponds to a function for converting brightness into a gradation value. Specifically, the OETF in FIG. 5B is expressed by Formula 2 below. In Formula 2, q_in is an input value of the OETF and is a gradation value obtained by normalizing the gradation value (R value, G value, B value, etc.) proportional to the brightness to a range of 0.0 to 1.0. For example, q_in=0.0 corresponds to 0 nit, and q_in =1.0 corresponds to 10000 nit. In addition, q_out represents an output value of the OETF and is a value obtained by normalizing the gradation value (R value, G value, B value, etc.) to a range of 0.0 to 1.0. Further, q-out=1.0 corresponds to the upper limit of the gradation value (the upper limit corresponding to the number of bits), and q_out=0.0 corresponds to the lower limit of the gradation value. For example, when the number of bits of the gradation value is 10 bits, the upper limit of the gradation value is 1023, and the lower limit of the gradation value is 0.

[Math. 2]

$$q\_out = \left(\frac{c_1 + c_2 \cdot q\_in^{m_1}}{1 + c_3 \cdot q\_in^{m_1}}\right)^{m_2} \quad \text{Formula 2}$$

$m_1 = 0.1593017578125, m_2 = 78.84375,$
$c_1 = 0.8359375, c_2 = 18.8515625, c_3 = 18.6875$

As described above, in Embodiment 1, the captured HDR image is an image in accordance with the EOTF (PQ curve) in FIG. 5A. In other words, the captured HDR is an image captured by the OETF in FIG. 5B. The gradation value of the captured HDR image corresponds to the input value p_in of the EOTF and also corresponds to the output value q_out of the OEFT.

Figure 6A:
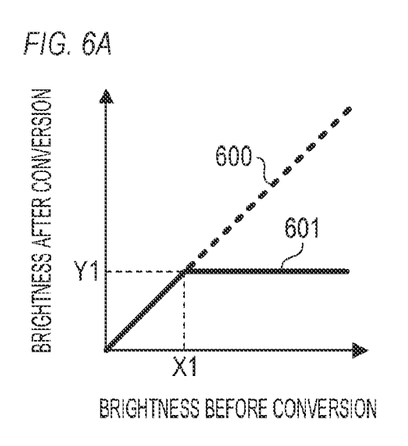
FIGS. 6A and 6B are diagrams illustrating examples of brightness conversion characteristic according to Embodiment 1.

Characteristic 600 (brightness-conversion characteristic) in FIG. 6A corresponds to characteristic obtained by combining the EOTF in FIG. 5A and the OETF in FIG. 5B. The horizontal axis in FIG. 6A represents the brightness (the input value q_in of the OETF) of the image before the gradation conversion, and the vertical axis in FIG. 6A represents the brightness (the output value p_out of the EOTF) of the image after the gradation conversion. Assuming that the maximum brightness of the display range is brightness Y1, in this case, the conversion characteristic determination unit 201 determines characteristic 601 in accordance with the brightness Y1 and corrects the EOTF in FIG. 5A so that the characteristic 601 is achieved. The characteristic 601 or the corrected EOTF is the conversion characteristic determined in S401. As illustrated in FIG. 6A, the characteristic 601 approximately (substantially) matches (matches) the characteristic 600 in the brightness range (the brightness range of brightness X1 or below) corresponding to the display range (the brightness range of the brightness Y1 or below) in the characteristic 600. Therefore, the brightness of the brightness X1 or below with both the characteristic 600 and the characteristic 601 is converted into approximately the same (the same) brightness in the gradation conversion and displayed in accordance with the PQ curve. This enables a display suitable for the characteristic of human visual perception. However, with the characteristic 601, the brightness above the brightness X1 is converted into the brightness Y1 (clipped) by the gradation conversion and displayed as blown-out highlights.

In S402, the gradation conversion unit 202 performs gradation conversion on the captured HDR image in accordance with the conversion characteristic determined in S401. Specifically, the gradation conversion unit 202 performs gradation conversion on the captured HDR image in accordance with the corrected EOTF. This generates an HDR image for display as a gradation-converted image.

Figure 7A:
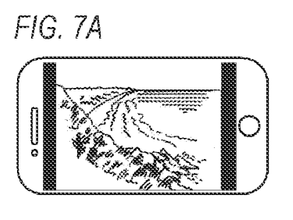
FIGS. 7A to 7C are diagrams illustrating display examples according to Embodiment 1.

In S403, the control unit 101 outputs the HDR image for display generated in S402 to the display unit 106. FIG. 7A illustrates a display example of the HDR image for display generated in S402. As described above, with the characteristic 601 in FIG. 6A, the brightness above the brightness X1 is converted into the brightness Y1 in the gradation conversion and displayed as blown-out highlights. Consequently, while the sun and clouds are included in the captured HDR image (the image before the gradation conversion), the sun and clouds are overexposed in the display example in FIG. 7A.

Referring back to FIG. 3, in S303, the control unit 101 determines whether a start operation for blown-out-highlight reduction has been performed as a user operation using the UI unit 104 so as to start the reduction of the blown-out highlights in the HDR image for display, which is displayed in S302. For example, when the sun and clouds are blown out as in the display example in FIG. 7A, and when the user wishes to reduce the blown-out highlights and make the sun and clouds recognizable as in a display example in FIG. 7B, the user performs the start operation for the blown-out-highlight reduction. The start operation for the blown-out-highlight reduction is, for example, touching a button displayed on the display unit 106, pushing a button (physical button) provided on the image processing apparatus 100, or the like. As a more specific example, an item "blown-out-highlight reduction" is displayed in the menu of adjustment items including "exposure", "contrast", "color", "white balance (color temperature)", "sharpness", etc. If the item of "blown-out-highlight reduction" is selected, the control unit 101 determines that the start operation for the blown-outhighlight reduction has been performed and proceeds with the processing to S304, and if not (if the start operation for the blown-out-highlight reduction is not performed), the control unit 101 ends the display control operation in FIG. 3.

Figure 7B:
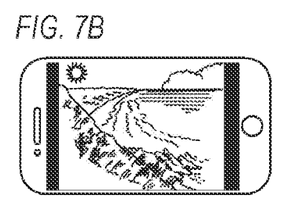
Figure 7C:
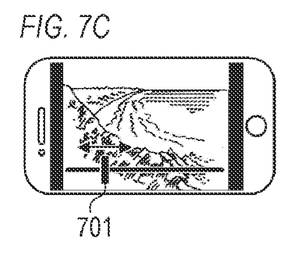

In S304, the control unit 101 performs a control operation for displaying an item (UI) for a user operation (range-specifying operation) to specify a dynamic range, together with the HDR image for display, on the display unit 106. Specifically, as illustrated in FIG. 7C, the control unit 101 performs a control operation for displaying a slider 701. The user can adjust the dynamic range (specified range) specified by the user by moving the slider 701. Specifically, the user can adjust the maximum brightness of the specified range by moving the slider 701. Therefore, the range-specifying operation may also be referred to as a user operation for specifying the maximum brightness of the specified range. By adjusting the specified range, the degree of the blown-out highlights on the HDR image for display is adjusted, which will be described in detail below. Therefore, the slider 701 may also be referred to as an item for adjusting the degree of the blown-out highlights. Such operation of moving the slider 701 is also used for adjusting the items such as "exposure", "contrast", "color", "white balance (color temperature)", and "sharpness" described above. That is, the user can perform the blown-out-highlight reduction operation with the same operational feeling as performing the other adjustment items.

In addition, this blown-out-highlight reduction is particularly effective for an image in which a relatively large amount of gradation in a high brightness region remains as image information, as in an HDR image. Therefore, whether or not a display target image is an HDR image may be determined at least before performing S303, and if the display target image is an HDR image, the blown-out-highlight reduction processing of the present embodiment may be enabled. If the display target image is an SDR image, the blown-out-highlight reduction processing may be disabled. To disable the blown-out-highlight reduction processing, for example, the item of "blown-out-highlight reduction" in the menu of the adjustment items described above may be hidden or grayed out. Alternatively, the slider 701 may be made immovable. Whether or not the display target image is an HDR image may be determined by referring to the extension of the image or a predetermined item in metadata, for example. Alternatively, the determination may be made by whether the image has a predetermined number of bits or by whether the display target image is in accordance with the PQ curve based on the metadata of the image.

The items such as the slider 701 may be generated by the control unit 101 or may be stored in advance in the ROM 102. The initial position of the slider 701 may be or may be not a position based on the maximum brightness (the maximum brightness checked in S301) of the current display range on the bar indicating a region where the slider 701 is movable. For example, the initial position of the slider 701 may be a position corresponding to the brightness that is approximately the same (the same) as the maximum brightness of the current display range on the bar. When the upper limit of the maximum brightness of the specified range or the display range is 1000 nit, and when the maximum brightness of the current display range is 500 nit, the initial position of the slider 701 may be the center of the bar. When the minimum brightness of the display range is changeable, the item for the corresponding range-specifying operation may include an item (slider, etc.) for specifying the minimum brightness of the specified range. The item for the corresponding range-specifying operation is not limited to the slider. The item may have a form similar to an item for specifying the exposure upon shooting.

In S305, the control unit 101 acquires information about the current specified range (the dynamic range specified by the user in S304). Specifically, the control unit 101 acquires information about the brightness corresponding to a current position of the slider 701 as information about the maximum brightness of the current specified range. For example, when the upper limit of the maximum brightness of the specified range or the display range is 1000 nit, and when the slider 701 is positioned at the center of the bar, the maximum brightness of the current specified range (the brightness corresponding to the current position of the slider 701) is 500 nit.

In step S306, the control unit 101 changes the setting of the display range from the setting checked in S301 based on the current specified range. Specifically, the control unit 101 changes the setting of the maximum brightness of the display range from the setting checked in S301 based on the maximum brightness of the current specified range. The changed display range does not need to be approximately the same as the specified range. However, in Embodiment 1, the control unit 101 changes the setting of the display range such that the display range becomes approximately the same (the same) as the specified range. Specifically, the control unit 101 changes the setting of the maximum brightness of the display range such that the maximum brightness of the display range becomes approximately the same (the same) as the maximum brightness of the specified range. For example, when the maximum brightness of the specified range is 500 nit, the maximum brightness of the display range is changed to 500 nit.

In S307, the control unit 101 performs a control operation for updating the display of the HDR image for display in accordance with the display range changed in S306. In Embodiment 1, by updating the HDR image for display, the display of the HDR image for display is updated. The control unit 101 then ends the display control operation in FIG. 3. When the start operation for the blown-out-highlight reduction is performed again, the processing of S304 through S307 is performed again.

A specific example of the processing in S307 will be described with reference to a flowchart in FIG. 4. However, description of the same processing as that in S302 will be omitted as appropriate.

In S401, the conversion characteristic determination unit 201 changes conversion characteristic of the gradation conversion of the captured HDR image in accordance with the display range (the maximum brightness of the display range) changed in S306. Assuming that the maximum brightness of the display brightness is changed from brightness Y1 to brightness Y2 (>Y1), in this case, the conversion characteristic determination unit 201 determines characteristic 602 in FIG. 6B in accordance with the brightness Y2 and corrects the EOTF in FIG. 5A so that the characteristic 602 is achieved. As the maximum brightness of the display range is increased from the brightness Y1 to the brightness Y2, the brightness range in which the gradation can be expressed is expanded from the brightness range of the brightness X1 or below to the brightness range of the brightness X2 (>X1) or below with the characteristic 602. Further, in a portion (the brightness range of the brightness X1 or below) where the display range after the change overlaps with the display range before the change, the characteristic 602 approximately matches (matches) the characteristic 601. Thus, even when the characteristic 601 are changed to the characteristic 602, the brightness of the brightness X1 or below can be maintained in the display of the HDR image for display.

Figure 6B:
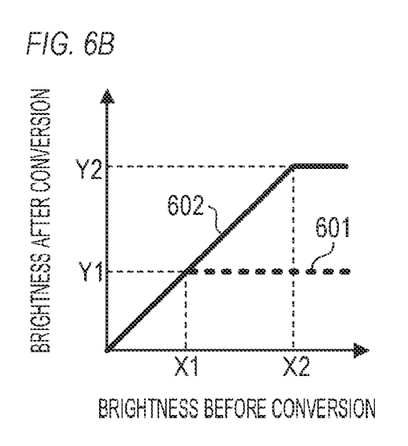

While, with the characteristics 601 and 602, the brightness of the HDR image for display (the brightness of the image after the gradation conversion; the output value p_out of the EOTF) is approximately proportional to (proportional to) the brightness of the captured HDR image (the brightness of the image before the gradation conversion; the input value q_in of the OETF) in the display range, the present invention is not limited to this example. In the display range, the brightness of the HDR image for display may be changed non-linearly with respect to the change of the brightness of the captured HDR image.

In S402, the gradation conversion unit 202 generates (updates) the HDR image for display by performing the gradation conversion on the captured HDR image in accordance with the conversion characteristic (the conversion characteristic after the change) determined in S401.

In S403, the control unit 101 outputs the HDR image for display generated in S402 to the display unit 106. This updates the display of the HDR image for display. FIG. 7B illustrates the display example of the HDR image for display (the updated HDR image for display) generated in S402. As described above, with the characteristic 602 in FIG. 6B, the brightness range that can express the gradation is expanded from the brightness range of the brightness X1 or below to the brightness range of the brightness X2 or below. Thus, in the display example in FIG. 7B, the blown-out highlights are reduced, and the sun and clouds, which are blown out in the display example in FIG. 7A, are recognizable.

As described above, according to Embodiment 1, when the range-specifying operation is performed, the item for the range-specifying operation is displayed, together with the gradation-converted image. In response to the execution of the range-specifying operation, the setting of the display range is changed based on the specified range, and in accordance with the changed display range, the display of the gradation-converted image is updated. In this way, the user can check the gradation-converted image while performing the range-specifying operation so that the display range can be easily (intuitively) changed to a desired brightness range. Furthermore, according to the Embodiment 1, the conversion characteristic of the gradation conversion is changed such that the display of the gradation-converted image is maintained in the portion where the display range after the change overlaps with the display range before the change. In this way, the image can suitably be displayed with the changed display range without changing the display of the image more than necessary.

When the specified range includes brightness beyond (outside) the largest settable display range, that is, for example, when the maximum brightness of the specified range is higher than the upper limit of the maximum brightness of the display range, the control unit 101 may perform a control operation for issuing a predetermined notification (a warning). The notification is issued, for example, by displaying an item, outputting a sound, causing a lamp (light-emitting diode) to emit light, etc. A display unit, a speaker, a lamp, etc., needed for the notification may be or may be not provided as a part of the image processing apparatus 100.

The image processing apparatus 100 may have a detection unit (optical sensor) that detects ambient light on the display unit 106. The control unit 101 may perform a control operation for limiting the brightness range that can be specified as a specified range in accordance with a detection result of the ambient light detected by the detection unit. For example, the control unit 101 may limit the maximum brightness of the brightness range that can be specified as a specified range such that the darker the ambient light is, the lower the maximum brightness becomes. This can prevent the HDR image for display from appearing extremely bright due to the effect of the ambient light. The control unit 101 may change the setting of the display range based on a specified range and a detection result of the ambient light without limiting the brightness range that can be specified as the specified range. The detection unit may be an external device or a part of the external device, and the image processing apparatus 100 may include an interface for connecting to the external device so that a detection result of the ambient light can be obtained.

When the processing target image (the image before the gradation conversion) is switched to a different image, the control unit 101 may return the setting of the display range to the setting (the setting checked in S301) before the change. If the maximum brightness of the display range is always increased in accordance with the range-specifying operation, by returning the setting of the display range to the setting before the change, the power consumption can be reduced.

The control unit 101 may perform a control operation for recording the changed display range in the storage unit in association with the image before the gradation conversion. The storage unit may be or may be not the ROM 102. In this way, when the image processing apparatus 100 or a different image processing apparatus displays the image whose display range has been changed in the past, again, the display in the past can be reproduced based on the changed display range. The storage unit may be included in the image processing apparatus 100 or provided as a storage device detachably mounted on the image processing apparatus 100.

Embodiment 2

Hereinafter, Embodiment 2 of the present invention will be described. An image processing apparatus according to Embodiment 2 performs processing similar to the processing described in Embodiment 1. Further, the image processing apparatus according to Embodiment 2 performs processing for determining an image range, which is a dynamic range of an image, based on a specified range and processing for generating an image having the determined image range. Hereinafter, differences from Embodiment 1 (configurations, processing, etc.) will be described in detail, and description of the same features as those in Embodiment 1 will be omitted as appropriate.

Figure 8:
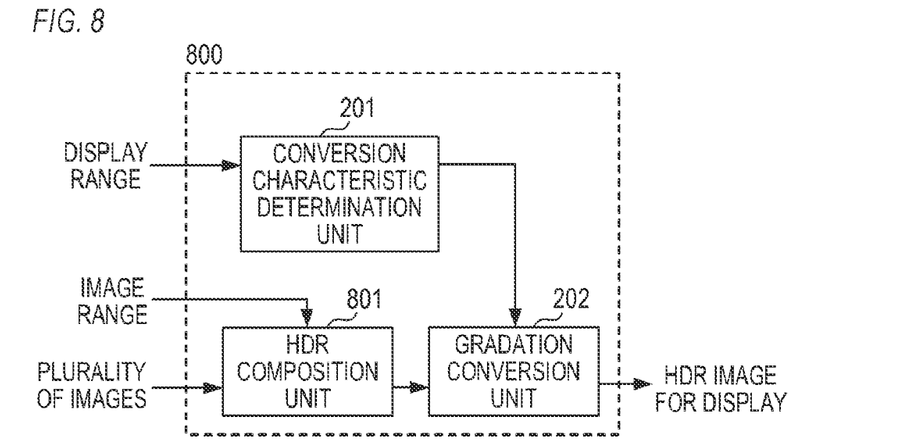
FIG. 8 is a block diagram illustrating a configuration example of a gradation conversion processing unit according to Embodiment 2.

The image processing apparatus according to Embodiment 2 has a configuration similar to that of the image processing apparatus 100 (FIG. 1) according to Embodiment 1. However, the image processing apparatus according to Embodiment 2 includes a gradation conversion processing unit 800 illustrated in FIG. 8 in place of the gradation conversion processing unit 200 according to Embodiment 1. FIG. 8 is a block diagram illustrating a configuration example of the gradation conversion processing unit 800. As with the gradation conversion processing unit 200, the gradation conversion processing unit 800 includes a conversion characteristic determination unit 201 and a gradation conversion unit 202. Further, the gradation conversion processing unit 800 includes an HDR composition unit 801. The HDR composition unit 801 generates one composite image by combining a plurality of images with different exposures. A dynamic range of the composite image can be freely changed by changing the plurality of images to be combined.

Figure 9:
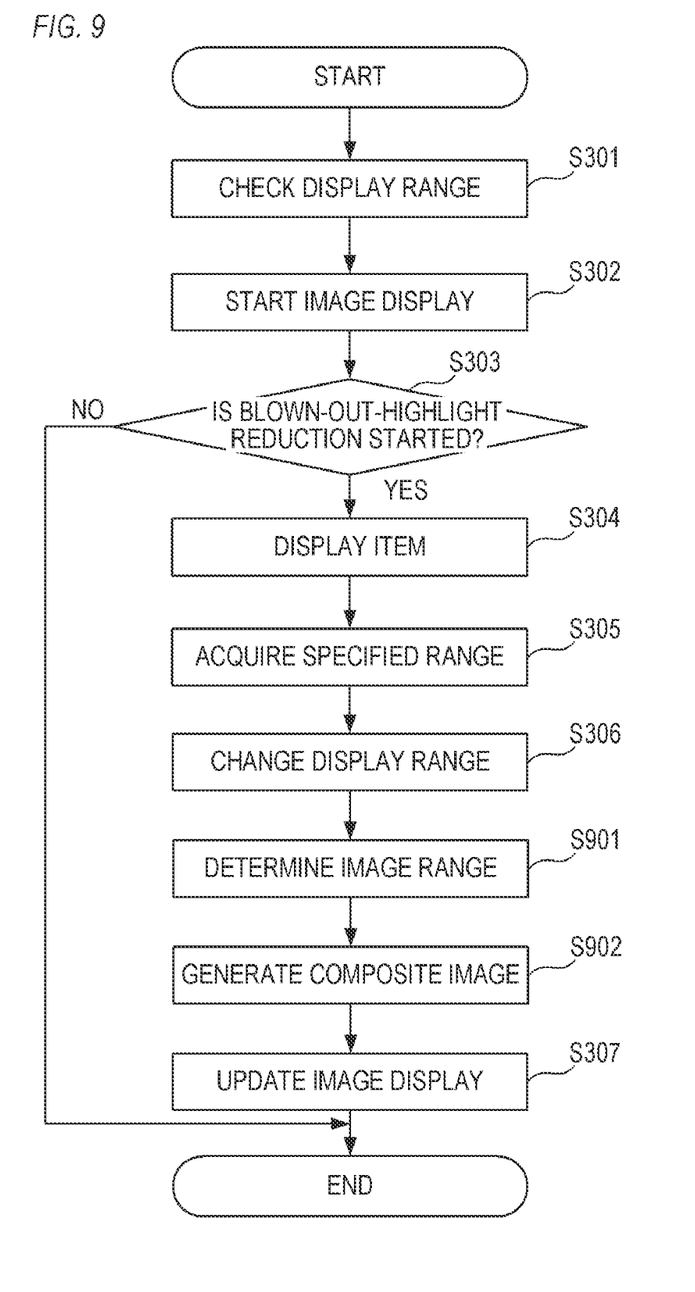
FIG. 9 is a flowchart illustrating an example of a display control operation according to Embodiment 2.

FIG. 9 is a flowchart illustrating an example of a display control operation performed by the image processing apparatus according to Embodiment 2. For example, in response to the activation of the image processing apparatus according to Embodiment 2, the display control operation in FIG. 9 is started by the control unit 101 executing a program read from the ROM 102 and expanded in the RAM 103. Processing of S301 through S307 in the display control operation in FIG. 9 is the same as that in Embodiment 1 (FIG. 3).

In S901, the control unit 101 determines an image range, which is a dynamic range of an image, based on a current specified range. Specifically, the control unit 101 determines maximum brightness of an image range based on maximum brightness of a current specified range. While the image range does not need to be approximately the same as the specified range, the control unit 101 determines the image range approximately the same (the same) as the specified range in Embodiment 2. Specifically, the control unit 101 determines brightness approximately the same (the same) as the maximum brightness of the specified range as the maximum brightness of the image range. For example, when the maximum brightness of the specified range is 4000 nit, 4000 nit is determined to be the maximum brightness of the image range.

In S902, the HDR composition unit 801 generates a composite image having the image range determined in S901 by combining a plurality of images with different exposures as an image before the gradation conversion. In this processing, the HDR composition unit 801 determines the plurality of images (the exposures, the number of images, etc.) used for the composition based on the image range. In Embodiment 2, in S307 (S402), the gradation conversion unit 202 generates an HDR image for display by performing the gradation conversion on the composite image generated in S902.

A specific example of the processing in S902 in a case where the maximum brightness of the image range is 4000 nit, that is, the image range is the brightness range of 0 to 4000 nit will be described. In this example, it is assumed that the dynamic range of a correctly exposed image is a brightness range of 0 to 1000 nit, and a composite image having a dynamic range of 0 to 2000 nit can be generated by combining the correctly exposed image and a one-level-lower exposure image. It is also assumed that a composite image having a dynamic range of 0 to 4000 nit can be generated by combining the correctly exposed image and a two-level-lower exposure image. The correctly exposed image is an image captured with a correct exposure. The one-level-lower exposure image is an image captured with an exposure lower by one level than the correct exposure, and the two-level-lower exposure image is an image captured with an exposure lower by two levels than the correct exposure.

As described above, by combining the correctly exposed image and the two-level-lower exposure image, a composite image having a dynamic range of 0 to 4000 nit can be generated. However, a composite image with the gradation expressed throughout the dynamic range of 0 to 4000 nit is not always generated. Therefore, to generate the composite image with the gradation expressed (without a gradation loss) throughout the dynamic range of 0 to 4000 nit, the HDR composition unit 801 combines the correctly exposed image, the one-level-lower exposure image, and the two-level-lower exposure image. Alternatively, as long as a composite image with the gradation expressed throughout the dynamic range of 0 to 4000 nit is generated, the HDR composition unit 801 may combine the correctly exposed image and the two-level-lower exposure image, without using the one-level-lower exposure image. The number of images used for the composition is not particularly limited, and more than three images may be used.

Figure 10:
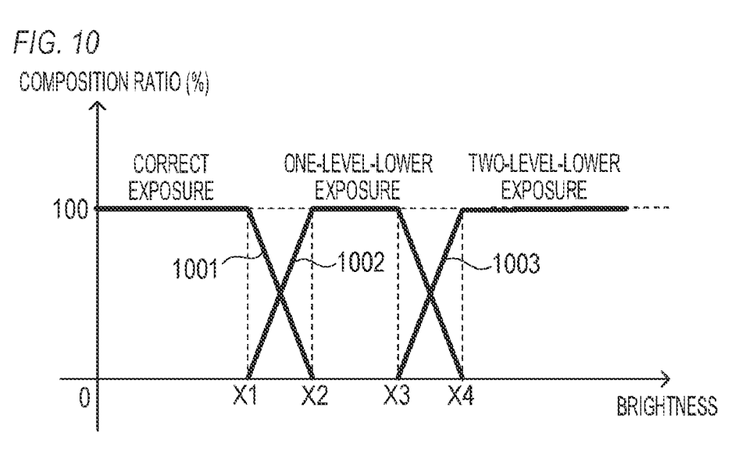
FIG. 10 is a diagram illustrating an example of a composition ratio used for HDR composition according to Embodiment 2.

An example method for the composition (HDR composition; weighted composition) by the HDR composition unit 801 will be described with reference to FIG. 10. FIG. 10 illustrates an example of a composition ratio (weight) used when the correctly exposed image, the one-level-lower exposure image, and the two-level-lower exposure image are combined. A composition ratio 1001 is a composition ratio of the correctly exposed image, a composition ratio 1002 is a composition ratio of the one-level-lower exposure image, and a composition ratio 1003 is a composition ratio of the two-level-lower exposure image.

As illustrated in FIG. 10, the HDR composition unit 801 increases the respective brightnesses of the one-level-lower exposure image and the two-level-lower exposure image so as to match the brightnesses of the one-level-lower exposure image and the two-level-lower exposure image with the brightness of the correctly exposed image. Specifically, the HDR composition unit 801 increases the brightness of a portion of the one-level-lower exposure image where the gradations in both the one-level-lower exposure image and the correctly exposed image are expressed such that the brightness of the one-level-lower exposure image approximately matches (matches) the brightness of the correctly exposed image. Likewise, the HDR composition unit 801 increases the brightness of a portion of the two-level-lower exposure image where the gradations in both the two-level-lower exposure image and the correctly exposed image are expressed such that the brightness of the two-level-lower exposure image approximately matches (matches) the brightness of the correctly exposed image. In FIG. 10, the brightness of the one-level-lower exposure image is doubled, and the brightness of the two-level-lower exposure image is increased by four times.

Next, the HDR composition unit 801 combines the correctly exposed image, the one-level-lower exposure image, and the two-level-lower exposure image in accordance with the composition ratios 1001 to 1003. The composition ratio 1001 of the correctly exposed image is 100% until brightness X1 and linearly decreases from 100% to 0% with respect to the brightness increase from the brightness X1 to brightness X2. The composition ratio 1002 of the one-level-lower exposure image increases from 0% to 100% in proportion to the brightness increase from the brightness X1 to the brightness X2, remains at 100% from the brightness X2 to brightness X3, and linearly decreases from 100% to 0% with respect to the brightness increase from the brightness X3 to brightness X4. The composition ratio 1003 of the two-level-lower exposure image increases from 0% to 100% in proportion to the brightness increase from the brightness X3 to the brightness X4 and remains at 100% from the brightness X4. The composition ratios 1001 to 1003 are not limited to the examples illustrated in FIG. 10. As long as the total of the composition ratios 1001 to 1003 is always 100%, the composition ratios 1001 to 1003 may be set to any ratio.

As described above, according to Embodiment 2, an image range is determined based on the specified range, and by combining a plurality of images with different exposures, an image having the image range is generated as an image before the gradation conversion. In this way, the image in which degradation of the image quality such as blown-out highlights is further reduced can be displayed.

While the present invention has thus been described based on the preferred embodiments, the present invention is not limited to these specific embodiments, and the present invention includes various modifications without departing from the gist of the present invention. Further, the embodiments described above are merely examples of the present invention, and the embodiments can be appropriately combined.

A single piece of hardware may perform various control operations described above as the operations performed by the control unit 101, or a plurality of hardware components (for example, a plurality of processors and circuits) may share the processing to control the entire apparatus.

According to the present disclosure, the user can easily (intuitively) change the display range to a desired brightness range. Furthermore, the user can suitably display an image with the changed display range without changing the display of the image more than necessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-129528, filed on Jul. 30, 2020, and Japanese Patent Application No. 2021-103967, filed on Jun. 23, 2021, which are hereby incorporated by reference herein in their entirety.

What is claimed is:

1. An image processing apparatus comprising at least one memory and at least one processor which function as:
   an input unit configured to receive a predetermined user operation for an image displayed on a display;
   a change unit configured to perform control of increasing a display range of the display in a case where the predetermined user operation is received by the input unit;
   a determination unit configured to determine a dynamic range based on the display range increased by the change unit;
   a generation unit configured to generate a composite image having the determined dynamic range by combining a plurality of images;
   a processing unit configured to perform gradation conversion on the composite image to improve gradation of a high brightness portion, based on the display range increased by the change unit; and
   a control unit configured to perform control of enabling the increase in the display range in accordance with the predetermined user operation in a case where the image satisfies a predetermined condition and disabling the increase in the display range in accordance with the predetermined user operation in a case where the image does not satisfy the predetermined condition.

2. The image processing apparatus according to claim 1, wherein the increase in the display range includes an increase in maximum display brightness of the display.

3. The image processing apparatus according to claim 1, wherein the predetermined condition is a condition regarding a dynamic range of the image.

4. The image processing apparatus according to claim 1, wherein the predetermined condition is a condition regarding the number of bits of the image.

5. The image processing apparatus according to claim 1, wherein the image that satisfies the predetermined condition is a high dynamic range (HDR) image recorded in a predetermined format.

6. The image processing apparatus according to claim 1, wherein the image that does not satisfy the predetermined condition is a standard dynamic range (SDR) image.

7. The image processing apparatus according to claim 1, wherein, the processing unit changes conversion characteristic of the gradation conversion such that, in the display range increased by the change unit, display brightness of the composite image after the gradation conversion is proportional to display brightness of the composite image before the gradation conversion.

8. The image processing apparatus according to claim 1, wherein the control unit further performs control of recording in a storage the display range increased by the change unit, in association with the image before the gradation conversion.

9. The image processing apparatus according to claim 1,
   wherein the at least one memory and the at least one processor further function as an acquisition unit configured to acquire a detection result of ambient light on the display, and
   wherein the control unit further performs control of limiting the display range increased by the change unit, based on the detection result of the ambient light.

10. The image processing apparatus according to claim 9, wherein the control unit limits maximum display brightness of the display range increased by the change unit such that the darker the ambient light is, the lower the maximum display brightness becomes.

11. The image processing apparatus according to claim 1, wherein the control unit further performs control of issuing a predetermined notification in a case where the display range increased by the change unit includes display brightness outside a largest settable display range.

12. The image processing apparatus according to claim 1, wherein the predetermined user operation is an operation of a slider displayed on the display.

13. The image processing apparatus according to claim 1, wherein the input unit further receives, other than the predetermined user operation, another user operation for adjusting at least one of exposure, contrast, and color of the image displayed on the display, and
wherein the control unit enables the adjustment in accordance with the other user operation even in a case where the image does not satisfy the predetermined condition.

14. The image processing apparatus according to claim 1, wherein in a case where the image displayed on the display is switched to a different image, the control unit cancels the increase in the display range.

15. An image processing method comprising:
an input step of receiving a predetermined user operation for an image displayed on a display;
a change step of performing control of increasing a display range of the display in a case where the predetermined user operation is received in the input step;
a determination step of determining a dynamic range based on the display range increased in the change step;
a generation step of generating a composite image having the determined dynamic range by combining a plurality of images;
a processing step of performing gradation conversion on the composite image to improve gradation of a high brightness portion, based on the display range increased in the change step; and
a control step of performing control of enabling the increase in the display range in accordance with the predetermined user operation in a case where the image satisfies a predetermined condition and disabling the increase in the display range in accordance with the predetermined user operation in a case where the image does not satisfy the predetermined condition.

16. A non-transitory computer readable medium that stores a program, wherein the program causes a computer to execute an image processing method comprising:
an input step of receiving a predetermined user operation for an image displayed on a display;
a change step of performing control of increasing a display range of the display in a case where the predetermined user operation is received in the input step;
a determination step of determining a dynamic range based on the display range increased in the change step;
a generation step of generating a composite image having the determined dynamic range by combining a plurality of images;
a processing step of performing gradation conversion on the composite image to improve gradation of a high brightness portion, based on the display range increased in the change step; and
a control step of performing control of enabling the increase in the display range in accordance with the predetermined user operation in a case where the image satisfies a predetermined condition and disabling the increase in the display range in accordance with the predetermined user operation in a case where the image does not satisfy the predetermined condition.

* * * * *